(12) United States Patent
Koyama

(10) Patent No.: US 8,477,562 B2
(45) Date of Patent: Jul. 2, 2013

(54) COMMUNICATION DEVICE AND COMMUNICATION METHOD

(75) Inventor: Shunsuke Koyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 12/831,764

(22) Filed: Jul. 7, 2010

(65) Prior Publication Data

US 2011/0013480 A1    Jan. 20, 2011

(30) Foreign Application Priority Data

Jul. 15, 2009   (JP) ................................. 2009-166435

(51) Int. Cl.
*H04B 1/59* (2006.01)

(52) U.S. Cl.
USPC .............................. 367/131; 367/2; 367/134

(58) Field of Classification Search
USPC ............................................ 367/134, 131, 2
See application file for complete search history.

(56) References Cited

U.S. PATENT DOCUMENTS

| 7,272,074 B2 | 9/2007 | Basilico |
| 2007/0014189 A1* | 1/2007 | Basilico ........................ 367/128 |
| 2011/0013480 A1* | 1/2011 | Koyama ........................... 367/2 |

FOREIGN PATENT DOCUMENTS

| JP | 7-212268 A | 8/1995 |
| JP | 11-122690 A | 4/1999 |
| JP | 2000-278223 A | 10/2000 |
| JP | 2009-501343 A | 1/2009 |
| JP | 2011023923 A * | 2/2011 |

* cited by examiner

*Primary Examiner* — Daniel Pihulic
(74) *Attorney, Agent, or Firm* — Global IP Counselors, LLP

(57) ABSTRACT

A communication device includes: an ultrasonic oscillating unit which detects or generates an ultrasonic wave; a communication unit which transmits and receives information using the ultrasonic wave; a storage unit which stores a table to which a communication command to designate communication with the another communication device is allocated in time series, the table being shared by the another communication device; and a control unit which shifts the communication unit to one of a transmitting state, a receiving state, and a standby state that is neither the transmitting nor the receiving state, synchronously with the another communication device on the basis of the communication command in the table.

4 Claims, 5 Drawing Sheets

COMMUNICATION DEVICE AND COMMUNICATION METHOD

BACKGROUND

1. Technical Field

The present invention relates to a communication device and a communication method using ultrasonic waves.

2. Related Art

A diver under water needs to communication with other divers in order to secure his or her own safety. As a device which carries out communication using ultrasonic waves under water, a communication device is proposed which carries out full-duplex bidirectional communication via ultrasonic waves of two frequencies, as disclosed in JP-A-11-122690.

However, in order to carry out full-duplex bidirectional communication, it is necessary to provide both an ultrasonic oscillating unit which generates a frequency for transmission and an ultrasonic oscillating unit which generates a frequency for reception. The communication device is thus increased in size.

SUMMARY

An advantage of some aspects of the invention is that a communication device capable of bidirectional communication using ultrasonic waves with a simply configuration is realized.

The invention can solve at least a part of the problems mentioned above and the invention can be realized as the following embodiments and applications.

An aspect of the invention is directed to a communication device carrying out communication with another communication device using an ultrasonic wave as a transmission medium under water. The communication device includes: an ultrasonic oscillating unit which detects or generates an ultrasonic wave by one resonance frequency; a communication unit which transmits and receives information using the ultrasonic wave; a storage unit which stores a table to which a communication command to designate communication with the another communication device is allocated in time series, the table being shared by the another communication device; and a control unit which shifts the communication unit to one of a transmitting state, a receiving state, and a standby state that is neither the transmitting nor the receiving state, synchronously with the another communication device on the basis of the communication command in the table.

With such a configuration, the communication command is allocated in time series and the transmitting state, the receiving state and the standby state are switched synchronously with the another communication device on the basis of the table shared by the another communication device. Therefore, bidirectional communication with the another communication device can be carried out using the ultrasonic wave of one frequency. Thus, the communication device can be reduced in size. Moreover, since communication is carried out according to the table, the communication unit shifted to the standby state needs no signal processing for transmission or reception. Thus, power consumed by the communication unit can be reduced.

It is preferable that, in the above communication device, the communication unit transmits and receives the information to and from the another communication device, using a packet divided by a time length that does not exceed a predetermined time length.

With such a configuration, since communication using the packet is carried out, the information is sent divisionally and the information can be restored easily in case of trouble during transmission.

Another aspect of the invention is directed to a communication method for carrying out communication with another communication device using an ultrasonic wave as a transmission medium under water. The communication method includes: synchronizing with the another communication device on the basis of a table shared by the another communication device, with a communication command to designate communication with the another communication device being allocated to the table in time series; and with the use of the ultrasonic wave of one frequency, shifting a communication unit which transmits and receives information to and from the another communication device using the ultrasonic wave, to one of a transmitting state, a receiving state, and a standby state that is neither the transmitting state nor the receiving state.

With such a method, the communication command is allocated in time series and the transmitting state, the receiving state and the standby state are switched synchronously with the another communication device on the basis of the table shared by the another communication device. Therefore, bidirectional communication with the another communication device can be carried out using the ultrasonic wave of one frequency. Thus, the communication device can be reduced in size. Moreover, since communication is carried out according to the table, the communication unit shifted to the standby state needs no signal processing for transmission or reception. Thus, power consumed by the communication unit can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a communication device according to the invention will be described with reference to the drawings.

Figure 1:
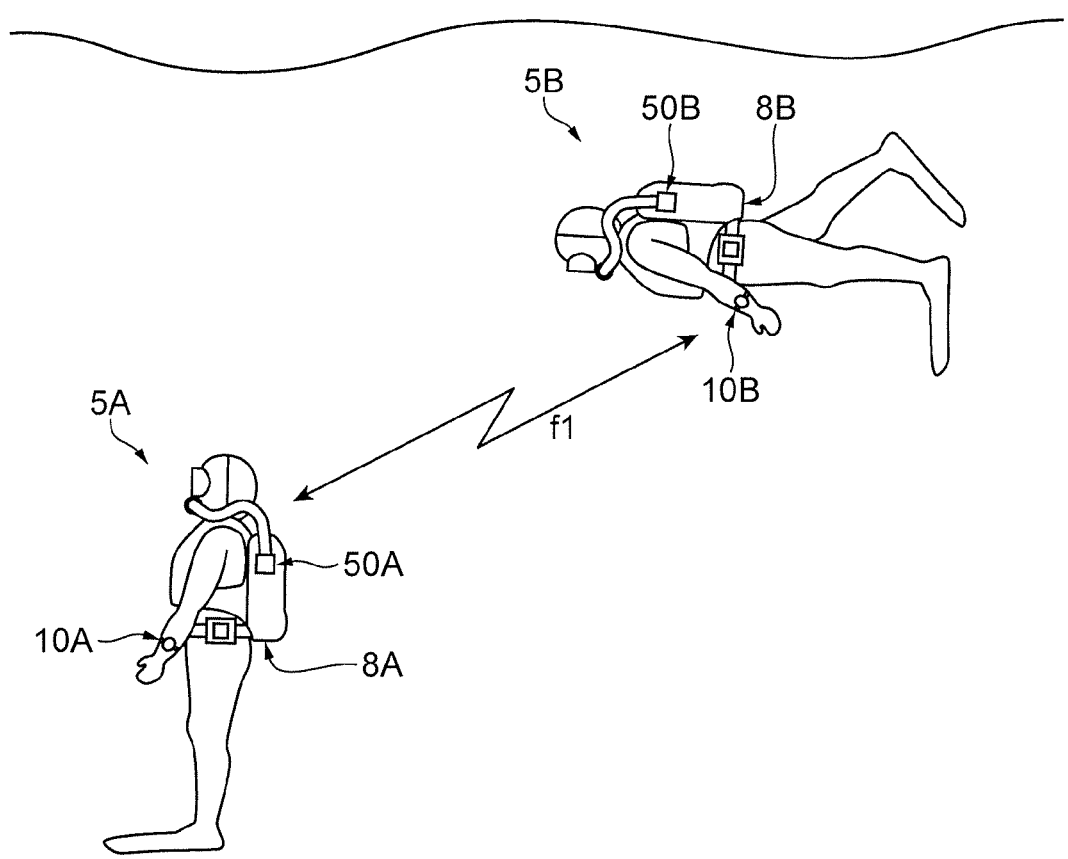
FIG. 1 illustrates communication between divers under water.

FIG. 1 illustrates communication between divers 5A and 5B under water. The divers 5A and 5B carry communications devices 10A and 10B, respectively, for communicating with each other under water using an ultrasonic wave as a transmission medium. These communication devices 10A and 10B are configured in a form similar to a diver's watch treated with waterproofing and water pressure resistance, and are worn by the divers 5A and 5B on the arm. On oxygen cylinders 8A and 8B held by the divers 5A and 5B, oxygen cylinder communication devices 50A and 50B with waterproofing and water pressure resistance processing are installed, respectively. The oxygen cylinder communication devices 50A and 50B acquire information about the quantity of remaining gas in the oxygen cylinders 8A and 8B on which these oxygen cylinder communication devices 50A and 50B are installed, and transmit the acquired information toward the communication devices 10A and 10B worn by the divers 5A and 5B via an ultrasonic wave.

The frequency (f1) of the ultrasonic wave used for the communication between the communication devices 10A and 10B is the same as the frequency (f1) of the ultrasonic wave used for the communication between the communication devices 10A and 10B and the oxygen cylinder communication devices 50A and 50B. It is assumed that this frequency (f1) is a frequency from 10 KHz to 2 MHz and the frequency is decided in consideration of the size of the communication devices 10A and 10B, power of a communication signal, advantages in the circuit configuration and the like. In this embodiment, 455 KHz is employed as the frequency (f1) and a bit rate of 2 kbps to 8 kbps is employed. It is assumed that the communication distance between the communication devices 10A and 10B is approximately 40 to 50 m.

Figure 2:
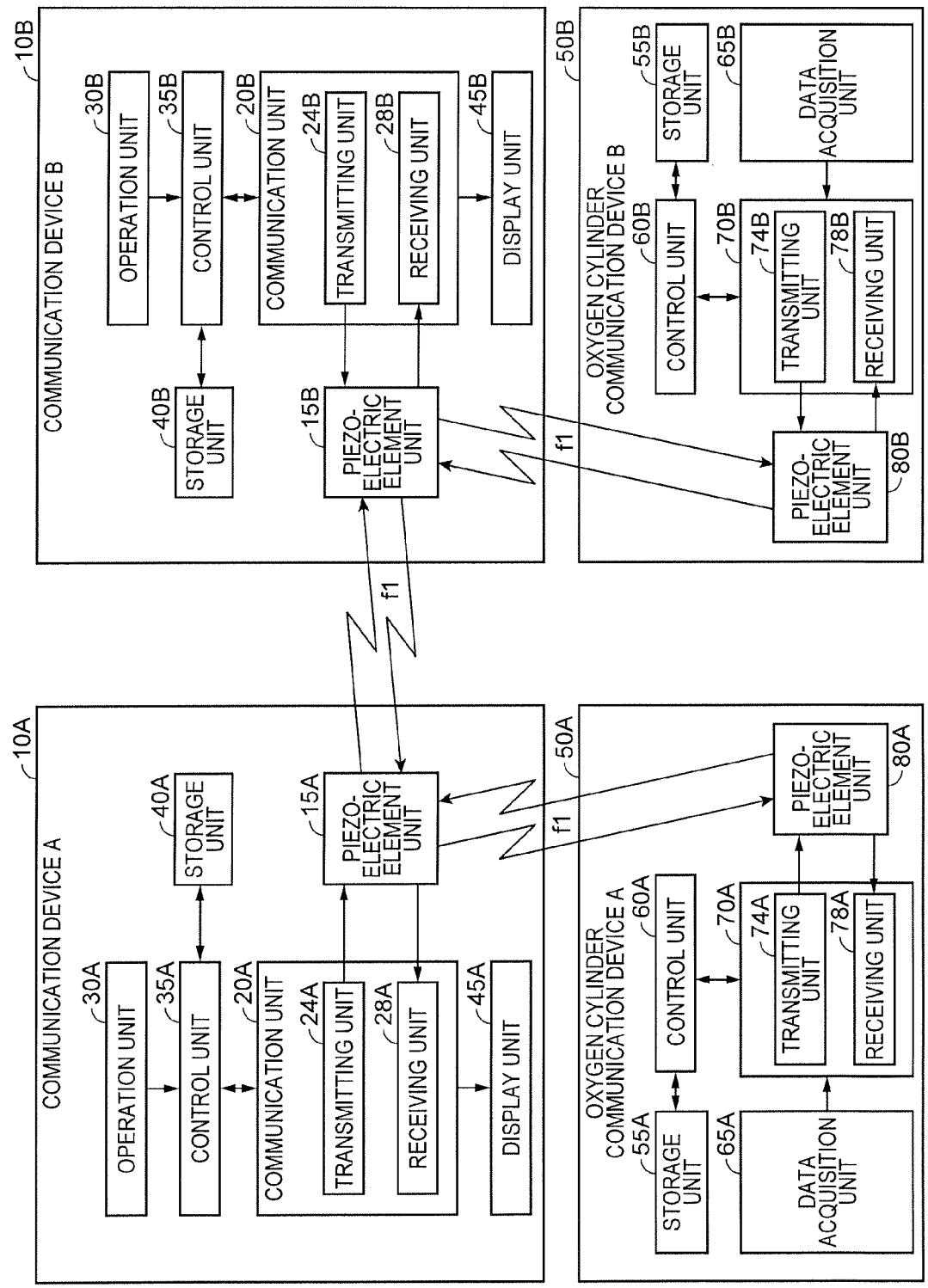
FIG. 2 illustrates the functional configuration of communication devices and oxygen cylinder communication devices according to an embodiment of the invention.

FIG. 2 illustrates the functional configuration of the communication devices 10A and 10B and the oxygen cylinder communication devices 50A and 50B. Of these devices, the communication device A (10A) and the communication device B (10B) have the same functional configuration and hardware configuration, and the oxygen cylinder communication device A (50A) and the oxygen cylinder communication device B (50B) have the same functional configuration and hardware configuration. Therefore, each functional unit of the communication device A (10A) and the oxygen cylinder communication device A (50A) as representatives will be described.

First, the communication device A (10A) will be described. The communication device A (10A) has an operation unit 30A, a control unit 35A, a storage unit 40A, a communication unit 20A, a piezoelectric element unit 15A, and a display unit 45A.

The operation unit 30A is operated by the diver 5A holding the communication device A (10A), and an operation command corresponding to the operation is sent to the control unit 35A. In this embodiment, it is assumed that the operation unit 30A includes buttons (not shown) arranged on the communication device A (10A).

Figure 4:
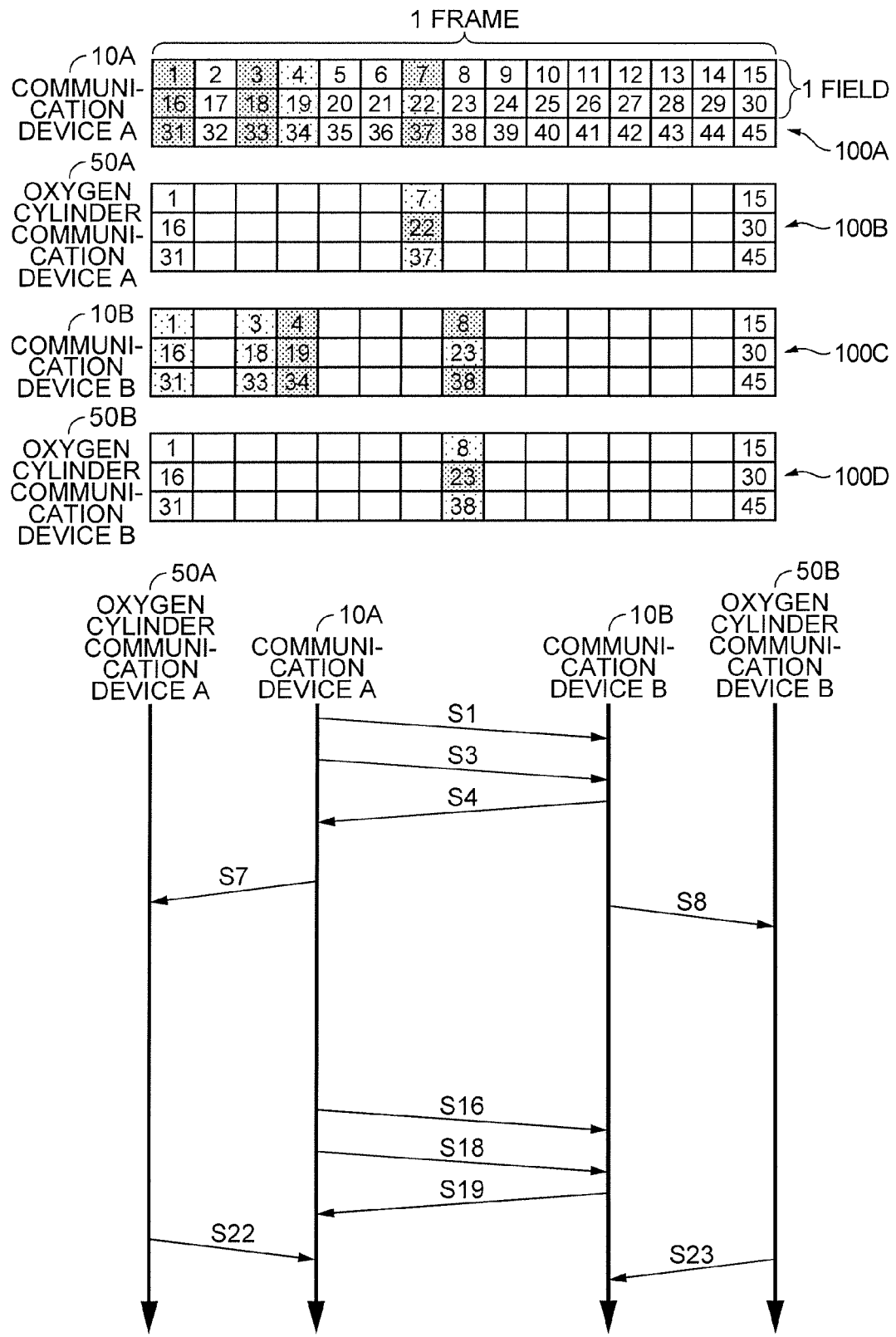
FIG. 4 shows a control method based on time slot.

The control unit 35A controls the operation of each functional unit of the communication device A (10A) in accordance with the operation command sent from the operation unit 30A. When the communication device A (10A) carries out communication, the control unit 35A controls a transmission and reception command or a non-communication command so as to shift the communication unit 20A to a communication state of transmission or reception (communication mode) or a non-communication state where transmission or reception is not carried out (standby mode) in accordance with a table (time slot) 100A (FIG. 4).

More specifically, when transmission or reception is carried out by the communication unit 20A in accordance with a time slot 100A (FIG. 4), the control unit 35A shifts the communication unit 20A to the communication mode in which a predetermined current is consumed at the time of transmission or reception. After shifting the communication unit 20A to the transmitting state or the receiving state, the control unit 35A commands transmission or reception. Meanwhile, when transmission or reception is not carried out by the communication unit 20A in accordance with the time slot 100A (FIG. 4), the control unit 35A shifts the communication unit 20A to the standby state, which is neither the transmitting state nor the receiving state, the current that is consumed is reduced, compared with the communication mode.

The communication device A (10A) and the communication device B (10B) are manufactured in such a manner that one of these communication devices can be set to control communication as a master while the other can be set to follow the control of the master as a slave. In this embodiment, the communication device A (10A) is set as a master and the communication device B (10B) is set as a slave.

In this embodiment, information transmitted from the communication device A (10A) to the communication device B (10B) is formulaic phrases. The formulaic phrases include requests and messages to the communication partner such as "Help" and "Come closer" and are stored in the storage unit 40A in advance. In accordance with an operation on the communication device A (10A), one of the formulaic phrases is called from the storage unit 40A and transmitted to the communication device B (10B). Information transmitted from the communication device A (10A) to the oxygen cylinder communication device A (50A) is a request signal or the like to request the oxygen cylinder communication device A (50A) to transmit information. Thus, in this embodiment, it is assumed that the volume of information delivered in one communication is approximately 30 bytes.

The storage unit 40A stores the time slot 100A (FIG. 4) for communication with the communication device B (10B) and the oxygen cylinder communication device A (50A), communication conditions, communication procedures, attribute information of the communication device A (10A) and the communication partner, and the formulaic phrases.

The communication unit 20A has a transmitting unit 24A and a receiving unit 28A. The transmitting unit 24A generates a communication signal of a frequency (f1) modulated by a formulaic phrase or request signal to be transmitted, and amplifies the generated communication signal to a predetermined output, thereby generating a high-frequency signal. The generated high-frequency signal is sent to the piezoelectric element unit 15A. The data configuration of the communication signal will be described later.

The receiving unit 28A acquires the communication signal from the high-frequency signal sent from the piezoelectric element unit 15A. If the high-frequency signal is transmitted from the communication device B (10B), the acquired communication signal includes a formulaic phrase. This formulaic phrase is displayed on the display unit 45A. If the high-frequency signal is transmitted from the oxygen cylinder communication device A (50A), the acquired communication signal includes response information to the request signal. It is assumed that this response information is the remaining gas pressure in the oxygen cylinder 8A. The information of the remaining gas pressure is converted to information indicating the time remaining by the control unit 35A and the converted information is displayed on the display unit 45A.

The piezoelectric element unit 15A is an ultrasonic oscillating unit having a resonance frequency (f1). In this embodiment, an ultrasonic oscillator (not shown) which transmits and receives ultrasonic waves by elastic oscillation is employed as the piezoelectric element unit 15A. If ultrasonic oscillation is detected, this ultrasonic oscillator converts the ultrasonic oscillation to a high-frequency signal and outputs the high-frequency signal. Meanwhile, if a high-frequency signal is inputted, the ultrasonic oscillator generates ultrasonic oscillation corresponding to the high-frequency signal and radiates the ultrasonic oscillation.

Figure 5:
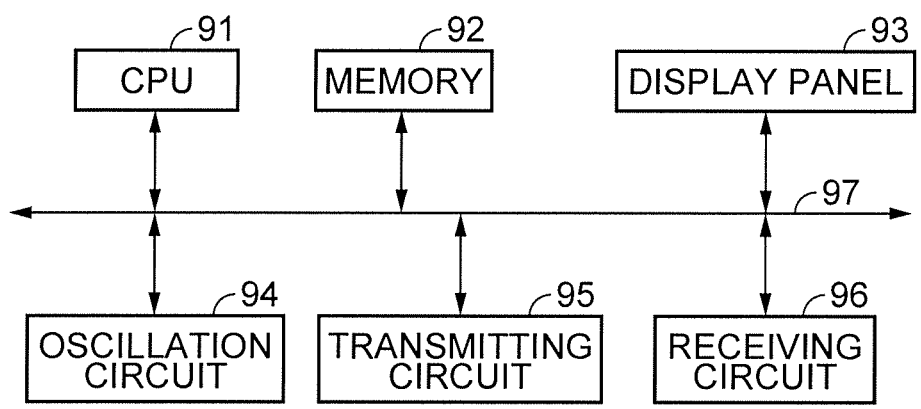
FIG. 5 illustrates the hardware configuration of the communication device according to the embodiment of the invention.

The communication device A (10A) has a CPU 91, a memory 92, an oscillation circuit 94, a transmitting circuit 95, a receiving circuit 96, a display panel 93 or the like, in the form of hardware units, as shown in FIG. 5. These hardware units are connected in such a manner that signals can be transmitted to and received from each other via a bus 97. Each of the above functional units is realized as these hardware units and software stored in the memory 92 cooperate with each other.

Next, the oxygen cylinder communication device A (50A) will be described. The oxygen cylinder communication device A (50A) has a storage unit 55A, a control unit 60A, a data acquisition unit 65A, a communication unit 70A, and a piezoelectric element unit 80A.

The storage unit 55A stores a time slot 100B (FIG. 4) for communicating with the communication device A (10A), communication conditions, communication procedures and the like. The control unit 60A controls the operation of each functional unit of the oxygen cylinder communication device A (50A). The data acquisition unit 65A acquires information about the quantity of remaining gas in the oxygen cylinder 8A and sends the acquired information to the communication unit 70A, in response to a command from the control unit 60A.

The communication unit 70A has a transmitting unit 74A and a receiving unit 78A. The transmitting unit 74A generates a communication signal of a frequency (f1) modulated in accordance with the information about the quantity of remaining gas sent from the data acquisition unit 65A and amplifies the generated communication signal to a predetermined output, thereby generating a high-frequency signal. The generated high-frequency signal is sent to the piezoelectric element unit 80A.

The receiving unit 78A acquires the communication signal from the high-frequency signal sent from the piezoelectric element unit 80A. The acquired communication signal is sent to the control unit 60A. Here, the communication signal is a request signal to request the transmission of the information about the quantity of remaining gas in the oxygen cylinder 8A. In response to this signal, the control unit 60A commands the data acquisition unit 65A to acquire the quantity of remaining gas in the oxygen cylinder 8A. When the oxygen cylinder communication device A (50A) carries out communication, as in the case of the communication device A (10A), the control unit 60A performs control to shift the communication unit 70A to the communication state (communication mode) or the non-communication state (standby mode) on the basis of the table (time slot) 100B (FIG. 4).

The piezoelectric element unit 80A, which is similar to the piezoelectric element unit 15A, is an ultrasonic oscillating unit having a resonance frequency (f1).

The oxygen cylinder communication device A (50A) has a CPU, a memory, an oscillation circuit, a transmitting circuit, a receiving circuit and the like in the form of hardware units, none of which is shown. Each of the above functional units is realized as these hardware units and software stored in the memory cooperate with each other.

Figure 3:
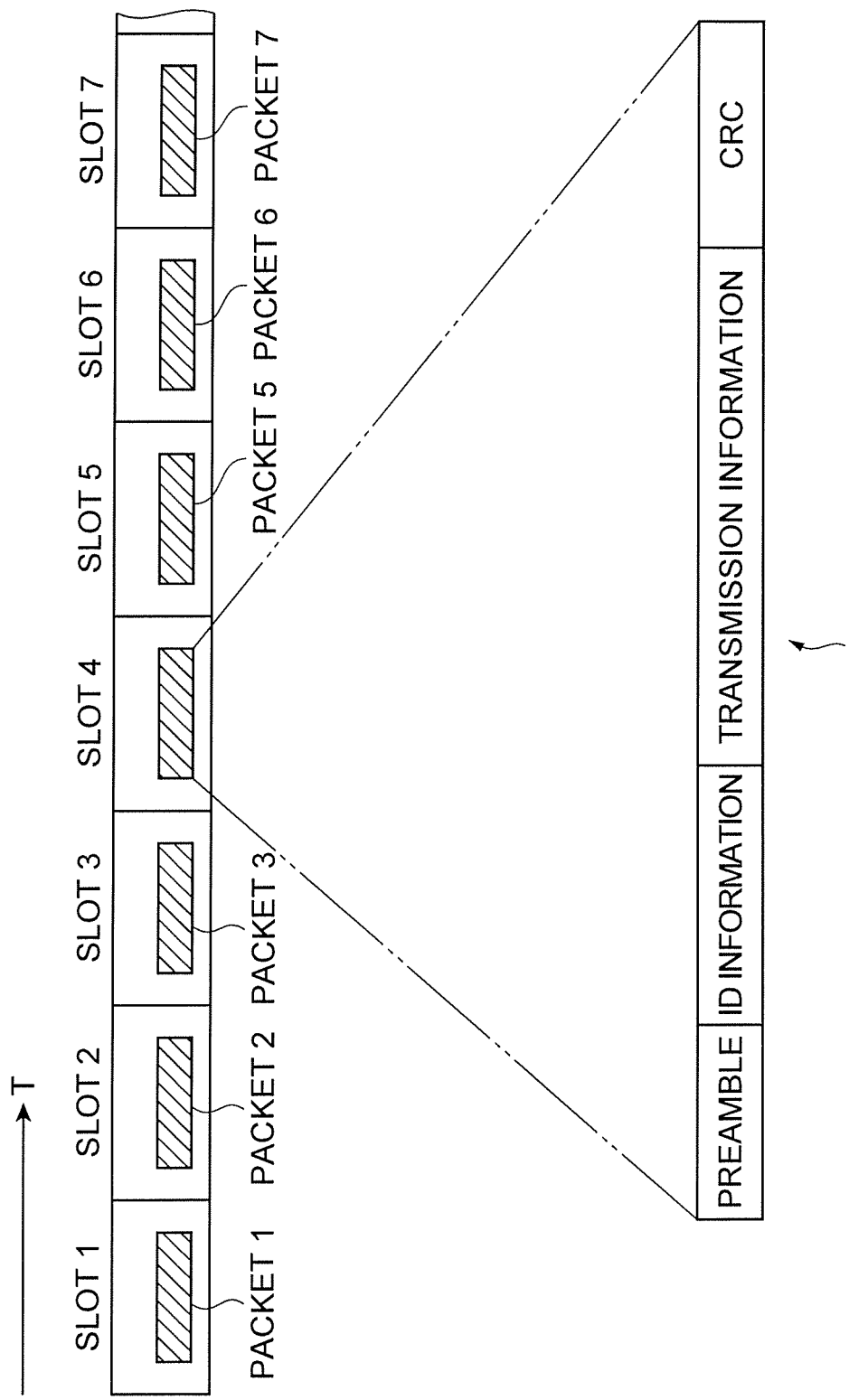
FIG. 3 illustrates the configuration of communication signals.

Next, the data configuration of the communication signal will be described with reference to FIG. 3 and FIG. 4. As shown in FIG. 3, the communication signal is divided into slots, each having a predetermined time length. Each piece of information is transmitted in a packet included in each slot. One packet includes a preamble area to indicate the leading end and to achieve synchronization, an ID information area, a transmission information area, and a cyclic redundancy check (CRC) area for error check. The time length of the packet is indefinite but does not exceed the time length of one slot.

The ID information area contains information including slot number, ID of the communication device, identification data of the communication device, identification data of the communication partner, manufacturer's serial number, transmission destination ID and the like. The transmission information area contains information including time information, remaining gas pressure and the like.

FIG. 4 shows a control method based on a time slot. In the top of FIG. 4, the driving timing for the communication device A (10A), the oxygen cylinder communication device A (50A), the communication device B (10B) and the oxygen cylinder communication device B (50B) is shown in each time slot (100A to 100D). The horizontal axis of these time slots (100A to 100D) represents time axis. The vertical axis is expressed by repetition of one horizontal axis. In this embodiment, if the bit rate is 4 kbps and each packet has about 30 bytes, it is preferable that one frame that decides the communication interval has 15 slots for underwater communication between the diver 5A and the driver 5B. The time length of one slot is decided in consideration of the time length of the packet and the propagation delay time of ultrasonic waves under water. Thus, in this embodiment, one frame including 15 slots and having a cycle of approximately one second is arranged in the direction of the horizontal axis, and one field including two frames is defined in the direction of the vertical axis.

The control units 35A, 35B, 60A and 60B sequentially refer to each slot in their respective time slots (100A to 100D) from the leading end of one field in the same timing and thus can synchronize with another device as a communication partner. Then, after all the slots forming one field are referred to, reference to the slots starts again at the slot at the leading end of one field and is repeated in the state where the synchronization is maintained. Thus, a frame starting with a slot 31 has the same attribute as a frame starting with a slot 1.

As shown in the time slots (100A to 100D), a communication command indicating a transmitting command or a receiving command is allocated to some slots in such a manner that the communication command is shared by each communication partner to enable communication. For example, with respect to the communication device A (10A) as the master, a transmitting command for transmission to another device is allocated to the slot 1 (hereinafter referred to as "S1"; the same applies to other slots as well), S16, S3, S18 and S7 in one field in the time slot 100A. Meanwhile, a receiving command for reception from another device is allocated to S4, S19 and S22. In the time slot 100A, the other slots than the above slots for transmission and reception are slots that represent the standby state. These time slots (100A to 100D) are decided at the communication device A (10A) as the master before the communication device A (10A), the oxygen cylinder communication device A (50A), the communication device B (10B) and the oxygen cylinder communication device B (50B) are started up and used. The time slots (100A to 100D) are made known to the other devices and the clocks provided in the devices become synchronized. Thus, the time slots (100A to 100D) are shared by the communication device A, the communication device B, the oxygen cylinder communication device A and the oxygen cylinder communication device B.

The bottom of FIG. 4 is a timing chart showing the timing when one field is referred to in the communication device A (10A), the communication device B (10B), the oxygen cylinder communication device A (50A) and the oxygen cylinder communication device B (50B). As shown in this chart, in S1 and S3, the communication device A (10A) and the communication device B (10B) shift to the communication mode. The communication device A (10A) transmits a packet to the communication device B (10B). The communication device B (10B) receives the packet sent from the communication device A (10A). In S1, in order to facilitate synchronization, it is preferable that certain information is transmitted in the packet from the master to the slave. It is assumed that the packet in S3 includes an operation command to the communication device B (10B), from among operation commands inputted via the operation unit 30A before S3 is executed, and therefore the communication device B (10B) executes the operation corresponding to the operation command included in the received packet. In S2, the communication device A (10A) and the communication device B (10B) do not transmit or receive anything and therefore both shift from the communication mode to the standby mode.

Next, in S4, the communication device A (10A) and the communication device B (103) in the standby mode shift to the communication mode. The communication device B (10B) transmits a packet to the communication device A (10A). The communication device A (10A) receives the packet sent from the communication device B (103). It is assumed that this packet includes response information about the result of the execution by the communication device B (10B) of the operation corresponding to the operation command. Next, in S5, the communication device A (10A) and the communication device B (10B) shift to the standby mode.

Next, in S7, the communication device A (10A) shifts to the communication mode and transmits a packet to the oxygen cylinder communication device A (50A). The oxygen cylinder communication device A (50A), which is in the standby mode all the time from the startup, shifts to the communication mode and receives the packet sent from the communication device A (10A). It is assumed that this packet includes an operation command from the communication device A (10A) to the oxygen cylinder communication device A (50A).

Next, in S8, the communication device A (10A) and the oxygen cylinder communication device A (50A) shift to the standby mode. The communication device B (10B) and the oxygen cylinder communication device B (50B) shift to the communication mode. Then, the communication device B (10B) transmits a packet to the oxygen cylinder communication device B (50B). The oxygen cylinder communication device B (50B) receives the packet sent from the communication device B (103). It is assumed that this packet includes an operation command from the communication device B (103) to the oxygen cylinder communication device B (50B). After that, in S9, the communication device B (10B) and the oxygen cylinder communication device B (50B) shift to the standby mode.

Next, in S16 and S18, the communication device A (10A) and the communication device B (10B) shift to the communication mode. The communication device A (10A) transmits a packet to the communication device B (10B). The communication device B (10B) receives the packet sent from the communication device A (10A). It is assumed that this packet includes an operation command from the communication device A (10A) to the communication device B (10B). The communication device B (10B) executes the operation corresponding to the operation command of the received packet. In S17, the communication device A (10A) and the communication device B (10B) do not transmit or receive anything and therefore both shift from the communication mode to the standby mode.

Next, in S19, the communication device B (10B) transmits a packet to the communication device A (10A). The communication device A (10A) receives the packet sent from the communication device B (103). It is assumed that this packet includes response information about the result of the execution by the communication device B (10B) of the operation corresponding to the operation command. Then, in S20, the communication device A (10A) and the communication device B (10B) shift to the standby mode.

Next, in S22, the communication device A (10A) and the oxygen cylinder communication device A (50A) shift to the communication mode. The oxygen cylinder communication device A (50A) transmits a packet to the communication device A (10A). The communication device A (10A) receives the packet sent from the oxygen cylinder communication device A (50A). It is assumed that this packet includes response information about the result of the execution of the operation corresponding to the operation command in S7.

Next, in S23, the communication device A (10A) and the oxygen cylinder communication device A (50A) shift to the standby mode. The communication device B (10B) and the oxygen cylinder communication device B (50B) shift to the communication mode. Then, the oxygen cylinder communication device B (50B) transmits a packet to the communication device B (10B). The communication device B (10B) receives the packet sent from the oxygen cylinder communication device B (50B). It is assumed that this packet includes response information about the result of the execution of the operation corresponding to the operation command in S8. After that, in S24, the communication device B (10B) and the oxygen cylinder communication device B (50B) shift to the standby mode. One field is executed as described above and the operation is repeated on the field basis until an end command is transmitted from the communication device A (10A) as the master.

As described above, if the communication device A (10A), the communication device B (10B), the oxygen cylinder communication device A (50A) and the oxygen cylinder communication device B (50B) have their respective slots in the standby state, each of the communication device A (10A), the communication device B (10B), the oxygen cylinder communication device A (50A) and the oxygen cylinder communication device B (50B) shifts to the standby mode in response to a command from the control unit (35A, 35B, 60A or 60B). Consequently, the current consumed by the communication unit (20A, 20B, 70A or 70B), which consumes a current of approximately 10 mA to several 10 mA in the communication mode, can be reduced and the power consumption can be reduced to approximately 1/10.

Since the slot number is held the ID information area of a packet, even if the temporal timing of the time slot 100 is shifted in one device, the shift can be corrected on the basis of the slot number included in the received packet.

Since slots are allocated to the plural devices having different functions such as the communication devices 10A and 10B and the oxygen cylinder communication devices 50A and 50B, a sensing function and a bidirectional data communication function can be realized.

The interval of communication and the frequency of communication can be set in the time slot 100 in accordance with the degree of urgency of the communication, the battery capacities of the communication devices 10A and 10B and the oxygen cylinder communication devices 50A and 50B and the like.

Since the number of devices to which slots are allocated can be increased in accordance with the number of slots in the time slot 100, N:N communication based on a bridging method can be easily realized, such as 1:1 communication, 1:N communication, and the communication between the oxygen cylinder communication devices 50A and 50B via the communication devices 10A and 10B.

The invention is described above with reference to the embodiment shown in the drawings. However, the invention is not limited to the embodiment and the following modifications can be considered.

(1) The oxygen cylinder communication devices 50A and 50B have the receiving function to receive a request signal. However, the oxygen cylinder communication devices 50A and 50B may also be configured to send information about the quantity of remaining gas at predetermined time intervals, without having a receiving function.

(2) Each slot in the time slots (100A to 100D) is not limited to information with respect to one device and may include information with respect to plural specified devices by having ID information of the receiver. Moreover, each slot may also include broadcast information that is transmitted from one device to plural unspecified devices.

(3) The information transmitted and received between the communication device A (10A) and the communication device B (10B) is not limited to formulaic phrases and may be formulaic phrase ID numbers that are determined in advance between the two communication devices in accordance with formulaic phrases.

(4) Although the invention adapting the above mentioned embodiments shown in the drawings indicates that the transmition and the reception of the information are carried out under water, the invention is not limited to be realized to such an extent. The information transmitted and received between the communication devices are also adapted in the air and those devices function practically as well.

The entire disclosure of Japanese Patent Application No. 2009-166435, filed Jul. 15, 2009 is expressly incorporated by reference herein.

What is claimed is:

1. A communication device comprising:
   an ultrasonic oscillating unit which detects or generates an ultrasonic wave;
   a communication unit which transmits and receives information using the ultrasonic wave;
   a storage unit which stores a table including first and second slots to which a first communication command and second communication command to designate communication with a second communication device is respectively allocated in time series, the table being shared by the second communication device; and
   a control unit which shifts the communication unit to one of a transmitting state, a receiving state, and a standby state that is neither the transmitting nor the receiving state, synchronously with the second communication device on the basis of the communication command in the table,
   the communication unit transmitting and receiving the information to and from the second communication device, and further using a first packet divided by a time length that does not exceed a predetermined time length and a second packet divided by the time,
   the first packet being included in the first slot,
   the second packet being included in the second slot,
   the first packet including a first slot number that is assigned to the first slot,
   the second packet including a second slot number that is assigned to the second slot.

2. The communication device according to claim 1, wherein the transmission and reception is carried out under water.

3. The communication device according to claim 1, wherein the ultrasonic oscillating unit detects or generates an ultrasonic wave by one resonance frequency.

4. A communication method comprising:
   detecting or generating an ultrasonic wave;
   transmitting and receiving information using the ultrasonic wave by a communication unit;
   storing a table including a first and second slots to which a first communication command and second communication command to designate communication with a second communication device is respectively allocated in time series;
   sharing the table by the second communication device and
   shifting the communication unit to one of a transmitting state, a receiving state, and a standby state that is neither the transmitting state nor the receiving state, synchronously with the second communication device on the basis of the communication command in the table,
   the communication unit transmitting and receiving the information to and from the second communication device, and further using a first packet divided by a time length that does not exceed a predetermined time length and a second packet divided by the time,
   the first packet being included in the first slot,
   the second packet being included in the second slot,
   the first packet including a first slot number that is assigned to the first slot,
   the second packet including a second slot number that is assigned to the second slot.

* * * * *